United States Patent [19]

Palmiter

[11] 3,931,994
[45] Jan. 13, 1976

[54] DIVIDER FOR USE IN THE OCCUPANT COMPARTMENT OF VEHICLE

[76] Inventor: James A. Palmiter, 520 N. Bluff St., Berrien Springs, Mich. 49103

[22] Filed: Sept. 16, 1974

[21] Appl. No.: 505,975

[52] U.S. Cl. .......................... 296/24 R; 280/150 B
[51] Int. Cl.² ........................................ B62D 33/06
[58] Field of Search.............. 296/24 R; 49/50, 57; 280/150 B; 160/180, 231 R, 229 R

[56] References Cited
UNITED STATES PATENTS

| 2,997,331 | 8/1961 | Kudner | 280/150 B X |
| 3,015,515 | 1/1962 | Halstead et al. | 280/150 B X |
| 3,044,800 | 7/1962 | Wicker | 296/24 R X |
| 3,049,373 | 8/1962 | Biggers | 280/150 B X |
| 3,547,217 | 12/1970 | Garza | 296/24 R X |
| 3,632,154 | 1/1972 | Woodrich | 296/24 R |
| 3,709,237 | 1/1973 | Smith | 160/231 R X |

FOREIGN PATENTS OR APPLICATIONS

| 468,496 | 1/1952 | Italy | 296/24 |

Primary Examiner—Robert G. Sheridan
Attorney, Agent, or Firm—Oltsch & Knoblock

[57] ABSTRACT

A divider which is for use in the occupant compartment of a vehicle and which includes upper and lower portions. The lower portion of the divider is hinged to the upper portion thereof and is shiftable between a closed position in which the upper and lower divider portions are generally coplanar and an open position. The divider is positioned above the front occupant's seat and extends vertically between the seat and the roof of the vehicle and traversely between the vehicle sides. The upper portion of the divider is connected to the vehicle so as to allow the lower portion of the divider to shift between its closed position serving to isolate the front section of the occupant compartment of the vehicle and its open position allowing for communication over the front occupant's seat.

5 Claims, 8 Drawing Figures

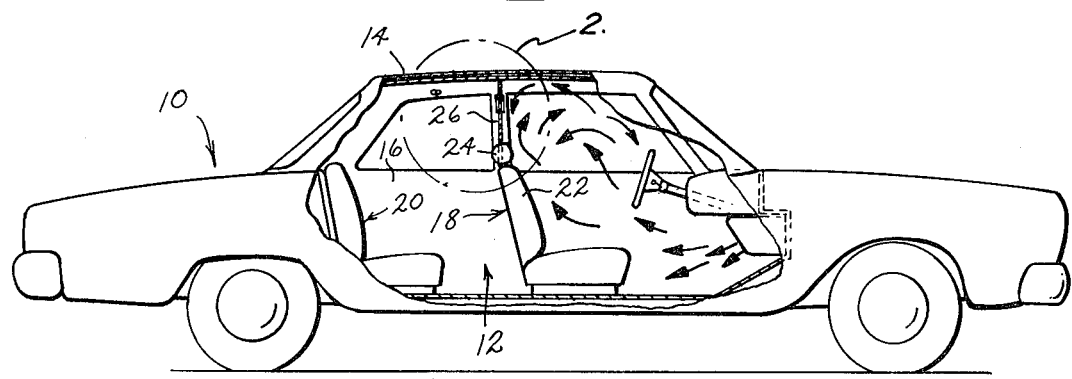
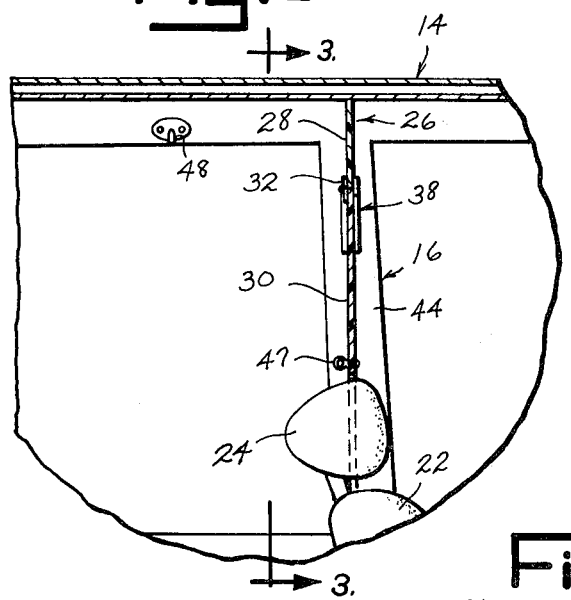
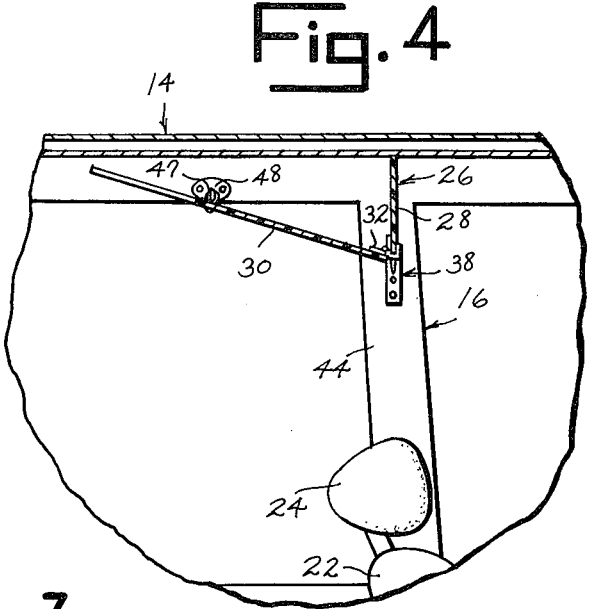
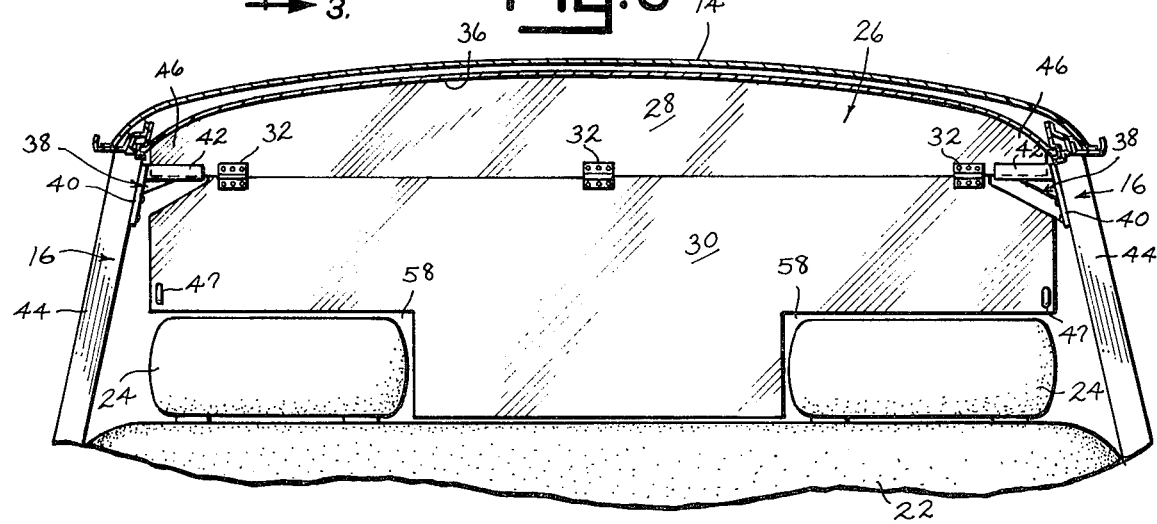

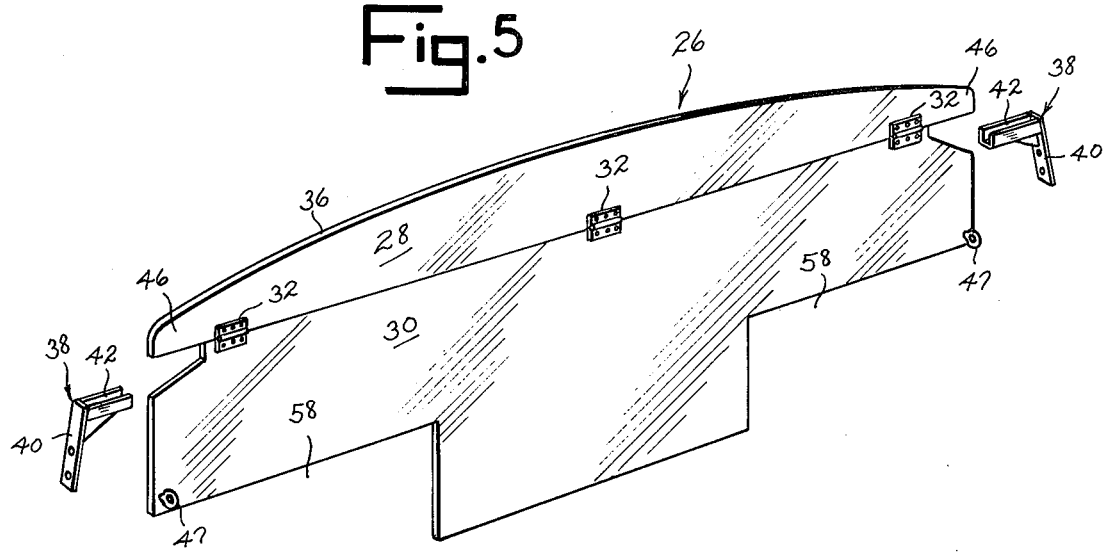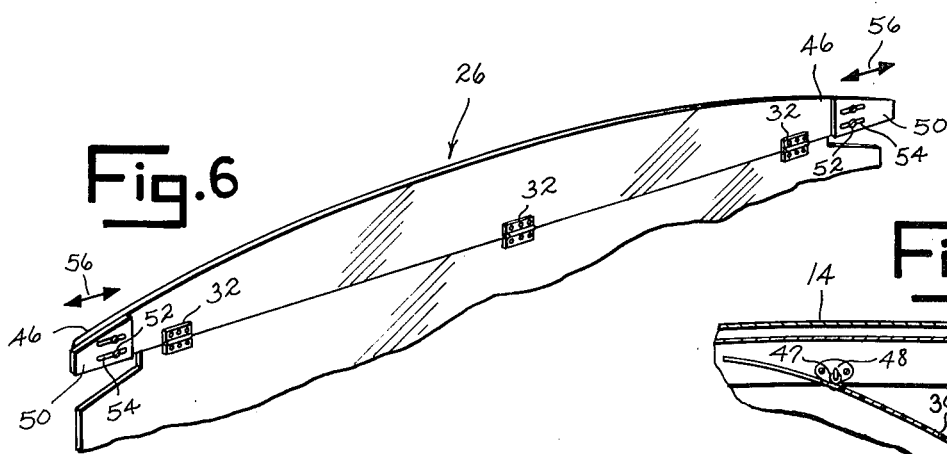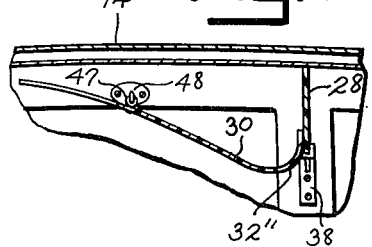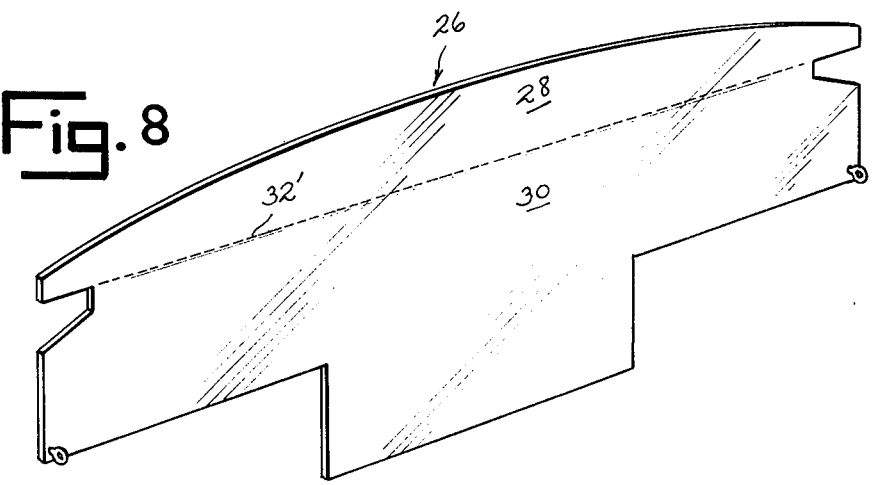

DIVIDER FOR USE IN THE OCCUPANT COMPARTMENT OF VEHICLE

SUMMARY OF THE INVENTION

This invention relates to a divider or partitioning member which is placed between the front and back seats of a motor vehicle and which serves to reduce the area of heating and cooling within the occupant compartment of the vehicle.

The divider of this invention includes upper and lower portions which are interconnected by hinge means. The upper portion of the divider is secured to the interior of the occupant compartment of the vehicle over the back rest of the vehicle's front seat. The lower portion of the divider is shiftable about its hinge means between a closed position in which it is generally aligned with the upper interconnected portion of the divider to form an isolating partition between the upper edge of the front seat and the vehicle roof and an open position in which it provides an open space between the upper edge of the front seat of the vehicle and the roof thereof so as to allow for air flow, such as during cooling and heating, and conversation to pass between the front and rear seats of the vehicle.

It is an object of this invention to provide a divider for use in the occupant compartment of a vehicle which separates the occupant compartment into two sections at the front seat of the vehicle.

Another object of this invention is to provide a divider or partition having open and closed positions which when in its closed position isolates the front seat portion of the occupant compartment of the vehicle from the back seat portion thereof.

Still another object of this invention is to provide a divider for the occupant compartment of a vehicle by which air conditioning and heating within the vehicle is restricted to the front seat area thereof.

Other objects of this invention will become apparent upon a reading of the invention's description.

BRIEF DESCRIPTION OF THE DRAWINGS

FIG. 1 is a side view of a motor vehicle having a portion cut away to expose the interior of the occupant compartment of the vehicle and having one embodiment of the divider of this invention installed therein.

FIG. 2 is a detailed view of the divider of FIG. 1 as seen within broken line 2 of FIG. 1 and shown in its closed position.

FIG. 3 is a sectional view of the divider taken along line 3—3 of FIG. 2.

FIG. 4 is a detailed view of the divider of FIG. 2 shown in its open position.

FIG. 5 is an isolated perspective view of the divider and component parts thereof used to anchor the divider within the vehicle.

FIG. 6 is a fragmentary view of the divider of FIG. 5 shown in modified form.

FIG. 7 is a fragmentary view of the divider in cross section shown in modified form and in an open position.

FIG. 8 is a perspective view of another embodiment of the divider.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

In FIG. 1, a motor vehicle 10 is shown. Vehicle 10 includes an occupant compartment 12, partially enclosed by a roof 14 and spaced sides 16. A front seat 18 and a back seat 20 are located within compartment 12. Front seat 18 includes a back rest 22 which carries head rests 24.

The divider 26 of this invention includes an upper portion 28 and a lower portion 30, each of which is preferably planar. Lower portion 30 is hinged to upper portion 28 so as to be shiftable relative to the upper portion of the divider. The manner of hinging lower portion 30 to upper portion 28 of the divider may vary. In FIGS. 1-6, the lower portion 30 is hinged to upper portion 28 by means of hinge brackets 32. In FIG. 8 the hinge 32' is molded onto portions 28 and 30 as an integral part of the divider. In FIG. 7 the upper divider portion 28 is formed of a relatively stiff material and the lower divider portion 30 is formed of a flexible material so as to form a bend or hinge 32'' just below where portion 30 joins portion 28. Upper and lower portions 28 and 30 may be formed of a variety of materials, such as fiberglass or plastic. In the case of a plastic it is preferable that the material be transparent so as not to reduce the rear vision of the driver of the vehicle or reduce the forward vision of any passengers riding in vehicle back seat 20.

Portions 28 and 30 of the divider extend transversely of the vehicle from one side 16 to the other side 16 thereof. Upper portion 28 has its upper edge 36 preferably formed on a curvature which conforms to the transverse inner surface of the vehicle roof 14 above back rest 22 of front seat 18 of the vehicle. A pair of brackets 38 are utilized to secure divider 26 at its upper portion 28 to the vehicle. Brackets 38 include a flange part 40 and a channel part 42. Each bracket 38 is mounted at its flange part 40 to the vehicle center post 44 or similar accessible location in general alignment with back rest 22 of front seat 18 of the vehicle. Channel parts 42 of brackets 38 are oppositely positioned and extend into the interior of the vehicle. Ends 46 of upper portions 28 of the divider fit into bracket channel parts 42 with upper edge 36 of portion 28 being positioned closely adjacent and following the inner surface of roof 14. With upper portion 28 of the divider so supported within occupant compartment 12 of the vehicle by brackets 28, lower portion 30 of the divider is shiftable about hinge brackets 32 from a closed position, such as that illustrated in FIGS. 1, 2 and 3 in which the lower divider portion extends to the upper edge of back rest 22 of vehicle front seat 18, and an open position, such as that illustrated in FIG. 4 in which the lower divider portion is swung rearwardly relatively to the vehicle, to provide an opening between the lower edge of divider portion 28 and the front seat of the vehicle.

The outer edges of the lower divider portion are notched or cut away so as to accommodate brackets 38. Each lower outer edge of lower divider portion 30 is provided with an eyelet 47 by which the lower divider portion when swung into its open position can be connected to the clothes hook 48 usually provided within the interior of the vehicle occupant compartment. If no clothes hook is available, a suitable hook can be provided and secured to the frame adjacent the roof of the vehicle. Lower divider portion 30 remains in its closed position through the help of gravity and a slight amount of friction existing within hinge brackets 38. If desired, a suitable hook can be located near one or both of the head rests 24 of the vehicle to secure the lower divider portion in its closed position.

In FIG. 8, divider 26 is shown with a molded hinge construction 32' interconnecting its upper portion 28 and lower portion 30. The manner of operation and attachment of this embodiment of the divider is the same as that previously described for the divider illustrated in FIGS. 1–5.

In FIG. 6 ends 46 of upper divider portion 28 are provided with overlapping extensions 50. Each extension 50 is connected to an end 46 of the upper divider portion by means of screws 52 which extend through slotted openings 54 in the extension and which are turned into the upper divider portion. Slots 54 allow extensions 50 to slide outwardly and inwardly as indicated by arrows 56 in FIG. 6 so as to extend the size of the upper portion 28 of the divider in order to accommodate vehicles of various width as measured between sides 16.

The lower edge of lower divider portion 30 may be notched at 58 to accommodate head rests 24 carried by front seat 18 of the vehicle.

It is to be understood that the invention is not to be limited to the details above given but may be modified within the scope of the appended claims.

What I claim is:

1. A divider for use in the occupant compartment of a vehicle having a roof, spaced sides and an occupant seat with a back rest located between said sides and under said roof, said divider having a lower planar panel portion and an upper planar panel portion, hinge means pivotally connecting said lower portion to said upper portion wherein said lower portion is shiftable about the hinge means between a closed position in general alignment with said upper portion and an open position extending generally normally to the upper portion, said divider adapted to extend transversely of said vehicle from one side to the other side above the back rest of said seat, said upper portion and said lower portion when in its closed position adapted to extend between said vehicle roof and seat back rest, and means for securing said upper portion to said vehicle to enable said lower portion to shift between its closed position in which said upper and lower portions will extend extensively between said roof and seat back rest and its open position in which an open space will exist between said upper portion and seat back rest, said lower portion including means for securing said lower portion in its upper position to said vehicle, said upper portion including integral planar extensions, each extension having an upper edge and a lower edge, each upper edge generally conforming to the inside configuration of said roof and defining opposite end parts, said upper portion securing means including a pair of brackets each having a channel part cradling the lower edge of an end part of said upper portion.

2. The divider of claim 1 wherein said upper portion has an upper edge formed to generally conform to the inside surface in cross section of said vehicle roof.

3. The divider of claim 1 wherein each of said upper portion end parts are of a two piece extendible construction to enable the divider to fit within vehicles having sides of different spacing therebetween.

4. The divider of claim 1 wherein said lower portion is relieved to accommodate vehicle back rests which include head rests.

5. A divider for use in the occupant compartment of a vehicle having a roof, spaced sides and an occupant seat with a back rest located between said sides and under said roof, said divider having a lower panel portion and an upper panel portion, hinge means pivotally connecting said lower portion to said upper portion wherein said lower portion is shiftable about the hinge means between a closed position in general alignment with said upper portion and an open position extending generally normally to the upper portion, said divider adapted to extend transversely of said vehicle from one side to the other side above the back rest of said seat, said upper portion and said lower portion when in its closed position adapted to extend between said vehicle roof and seat back rest, means for securing said upper portion to said vehicle to enable said lower portion to shift between its closed position in which said upper and lower portions will extend extensively between said roof and seat back rest and its open position in which an open space will exist between said upper portion and seat back rest, said lower portion including means for securing said lower portion in its upper position to said vehicle, said upper portion including opposite end parts, said upper portion securing means including a pair of brackets each having a channel part cradling an end part of said upper portion, said lower portion including opposite end parts each having a notch formed therein adjacent said upper portion, and one said hinge bracket channel part fitting into each notch.

* * * * *